US005272008A

United States Patent [19]

Shain et al.

[11] Patent Number: 5,272,008

[45] Date of Patent: Dec. 21, 1993

[54] ENCAPSULATED OXIDATION-RESISTANT IRON-NEODYMIUM-BORON PERMANENT MAGNET

[75] Inventors: Jon C. Shain, Anderson; David E. Gay, Noblesville, both of Ind.

[73] Assignee: General Motors Corporation, Detroit, Mich.

[21] Appl. No.: 852,426

[22] Filed: Mar. 16, 1992

[51] Int. Cl.[5] ........................ B32B 15/08; B32B 15/18

[52] U.S. Cl. .................................... 428/407; 148/302; 428/413; 428/414; 428/480; 428/500

[58] Field of Search ............... 428/407, 413, 414, 480, 428/500; 148/302

[56] References Cited

U.S. PATENT DOCUMENTS

| | | | |
|---|---|---|---|
| 4,832,891 | 5/1989 | Kass | 264/101 |
| 4,842,656 | 6/1989 | Maines et al. | 148/302 |
| 4,869,964 | 9/1989 | Mazany | 428/418 |
| 4,876,305 | 10/1989 | Mazany | 524/401 |
| 4,988,755 | 1/1991 | Dickens, Jr. et al. | 524/401 |
| 5,063,011 | 11/1991 | Rutz et al. | 264/126 |

FOREIGN PATENT DOCUMENTS

| | | | |
|---|---|---|---|
| 0468449A1 | 7/1991 | European Pat. Off. . | |
| 0063901 | 4/1985 | Japan | 148/302 |

OTHER PUBLICATIONS

Patent Abstracts of Japan, vol. 16, No. 294 (E-1225) Jun. 29, 1992 & JP-40 78 107 (Sankyo Seiki) Mar. 12, 1992.

Patent Abstracts of Japan, vol. 12, No. 244 (E-631) (3091) Jul. 9, 1988 & JP-63 33 802 (Tohoku Metal Ind Ltd.) Feb. 13, 1988.

Patent Abstracts of Japan vol. 13, No. 407 (E-818) (3755) Sep. 8, 1989 & JP-11 47 806 (Sankyo Seiki) Jun. 9, 1989.

Patent Abstracts of Japan, vol. 14, No. 62 (E-883) (4005) Feb. 5, 1990 & JP-12 81 707 (Seiko Epson Corp.) Nov. 13, 1989.

"Topanol 205 Antioxidant", Product Information Bulletin, ICI Specialty Chemicals.

"CARSTAB DLTDP Antioxidant", Technical Bulletin, Morton Thiokol, Inc.

"Eastman Inhibitor OABH", Eastman Chemicals Publication No. D-137A, Dec. 1985.

U.S. Serial No. 07/710,427 Filed Jun. 7, 1991 to Ward et al.

*Primary Examiner*—Paul J. Thibodeau
*Assistant Examiner*—D. S. Nakarani
*Attorney, Agent, or Firm*—George A. Grove; Lawrence B. Plant; Domenica N. S. Hartman

[57] ABSTRACT

Oxidation-resistant, individually encapsulated neodymium-iron-boron permanent magnet particles are provided. The particles are individually coated with, preferably, three distinct organic layers and are useful for the subsequent formation of a molded permanent magnet article. The first coating is an antioxidant layer employed for the retardation of oxidation of the coated particle. The second intermediate layer consists of an appropriate thermosetting epoxy to provide the adhesion required during subsequent molding of the particles. The third and outermost layer consists of polystyrene and is employed to keep the particles free flowing, since the epoxy layer may be tacky after deposition, thereby hindering the free flowability of the particles. The coatings are applied sequentially using fluidized bed coating techniques. The encapsulated particles can then be molded and appropriately cured. In addition, the encapsulated particles exhibit enhanced oxidation resistance, including at elevated temperatures.

8 Claims, 1 Drawing Sheet

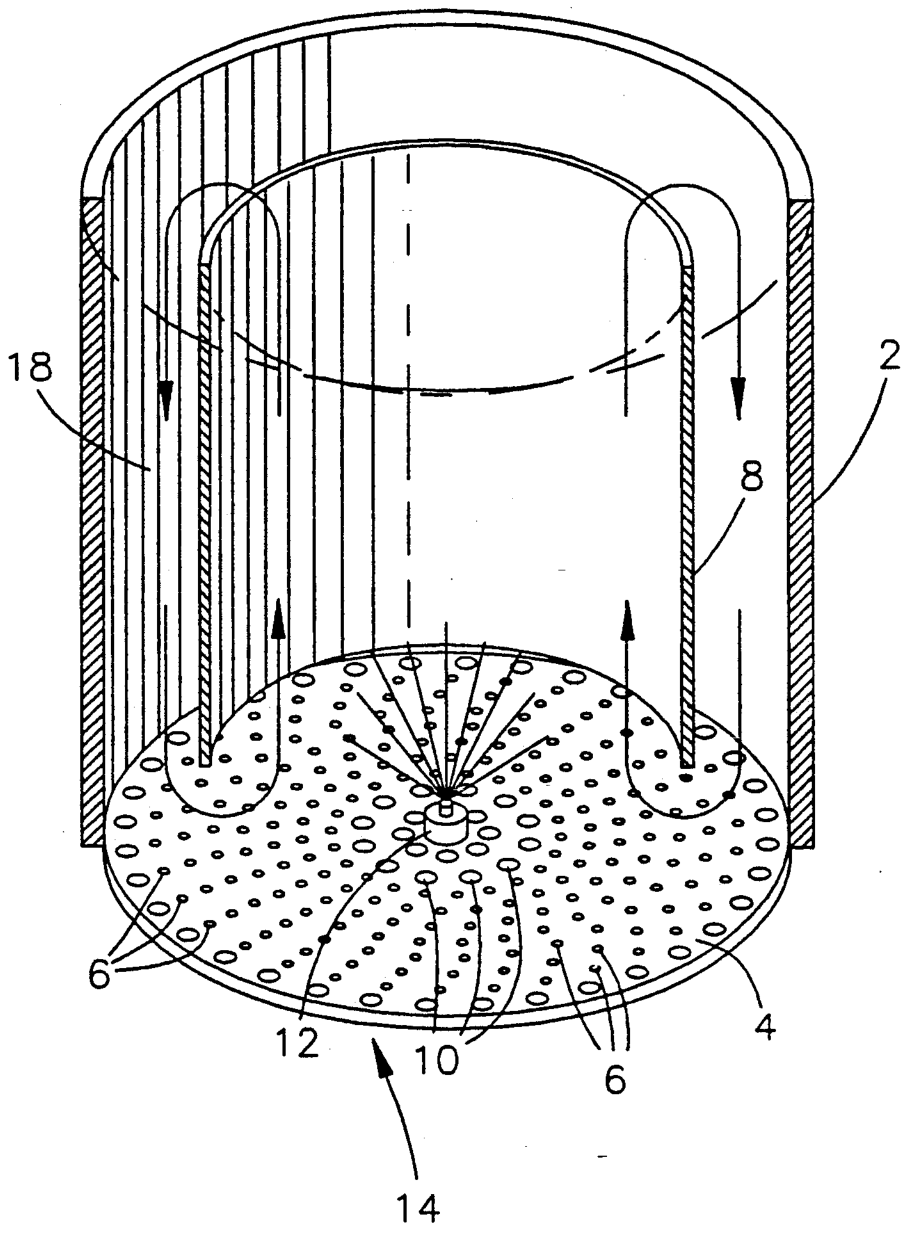
18
2
8
6
12
10
6
4
14

ENCAPSULATED OXIDATION-RESISTANT IRON-NEODYMIUM-BORON PERMANENT MAGNET

The present invention generally relates to the making of a powdered composition based on iron, neodymium and/or praseodymium, and boron which is magnetically isotropic and characterized by enhanced magnetic coercivity of at least about 5,000 Oersteds at room temperature. More specifically, this invention relates to the encapsulation of such powdered particles wherein each particle is individually coated with three discrete layers so as to enhance the oxidation resistance of such a powdered composition.

BACKGROUND OF THE INVENTION

Permanent magnets based on compositions containing iron, neodymium and/or praseodymium, and boron are now known and in commercial usage. Such permanent magnets contain as an essential magnetic phase grains of tetragonal crystals in which the proportions of iron, neodymium and boron (for example) are exemplified by the empirical formula $Fe_{14}Nd_2B$. These magnet compositions and methods for making them are described by Croat in U.S. Pat. No. 4,802,931 issued Feb. 7, 1989. The grains of the magnetic phase are surrounded by a second phase that is typically rare earth-rich, as an example neodymium-rich, as compared with the essential magnetic phase. It is known that magnets based on such compositions may be prepared by rapidly solidifying (such as by melt spinning) a melt of the composition to produce fine grained, magnetically isotropic platelets of ribbon-like fragments. High coercivity permanent magnets may be formed from these isotropic particles by practices which are known.

Generally, these particles are characterized by a composition which is quite reactive in that when these particles are exposed to the atmosphere, they are oxidized, thereby irreversibly decreasing the magnetic coercive force obtainable from such particles. This shortcoming becomes most apparent at elevated temperatures.

Many attempts have been made to protect these particles from such oxidation, such as by coating the powdered composition with a suitable epoxy resin. Generally, the methods employed for coating these powdered compositions include mixing the composition with an appropriate solvent and then either evaporating the coated solute onto the powdered particles or alternatively precipitating the coated solute onto the powder particles.

However, these prior attempts are characterized by shortcomings since the methods for coating the powdered composition typically do not result in the individual coating of each particle but rather result in the coating of clusters of the powdered composition. During subsequent processing and handling of such powders, the clusters tend to fracture, leaving uncoated surfaces of the powdered composition. This is problematic in that these uncoated surfaces can then oxidize in the atmosphere during subsequent exposure, thereby diminishing the overall integrity of the powdered composition.

Thus, it would be desirable to provide a means for enhancing the oxidation resistance of such permanent magnet particles, which results in the encapsulation of individual particles with a material which is sufficiently oxidation resistant. It would be further desirable if such a means did not detract from the processability of such particles for the subsequent formation of permanent magnet articles from such particles.

SUMMARY OF THE INVENTION

It is an object of this invention to provide a means for encapsulating individual particles of rare earth permanent magnet material based on iron, neodymium and/or praseodymium, and boron.

It is a further object of this invention that such a means include the encapsulation of such rare earth permanent magnet particles with a first organic coating which retards oxidation of the magnet particles.

Still further, it is an object of this invention that such encapsulated particles be additionally encapsulated with at least a second overlaying organic coating consisting of an appropriate epoxy resin binder so as to enhance the moldability of such particles.

Lastly, it is yet a further object of this invention that such encapsulated particles be optionally encapsulated with a third, outermost organic coating for improved handling and processing of such particles.

In accordance with a preferred embodiment of this invention, these and other objects and advantages are accomplished as follows.

According to the present invention, there is provided a means for forming oxidation-resistant, individually encapsulated neodymium-iron-boron permanent magnet particles. The encapsulated particles preferably have three distinct organic layers and are useful for the subsequent formation of a permanent magnet article.

The first coated layer is preferably an antioxidant layer employed for the retardation of oxidation of the coated particle and is present in a preferred amount of about 0.6 weight percent as compared to the total mass of the particles. This first layer consists of equal amounts of three constituents, two separate antioxidant compositions and an oxidation inhibitor composition.

The second intermediate layer consists of an epoxy binder or adhesive. This second layer is present in a preferred amount of about 1.5 weight percent as compared to the total mass of the particles.

The optional third and outermost layer consists of polystyrene and is employed to keep the particles free flowing, since the intermediate epoxy layer is generally sufficiently sticky or tacky after deposition that it hinders the free flowability of the particles. This third layer is present in a preferred amount of about 0.5 weight percent.

The coatings are applied sequentially using fluidized bed coating techniques. The coated particles are then molded using conventional techniques such as compression molding at temperature or compaction molding at room temperature and appropriately cured.

A particularly advantageous feature of this invention is that the permanent magnet particles are individually coated, therefore the oxidation resistance of the resultant magnet structure is enhanced even at elevated temperatures, as compared to previous methods which encapsulated clusters of particles. Also, with this invention, the individually coated particles are in a form which is compatible with subsequent processing so as to form a molded magnet structure. In addition, another advantage is that the particular materials employed in the organic layers may be easily varied if desired.

Other objects and advantages of this invention will be better appreciated from the following detailed description.

BRIEF DESCRIPTION OF THE DRAWINGS

Reference will be made to the accompanying drawing wherein the FIGURE shows a perspective, sectioned view of the coating zone of a Wurster-type fluidized bed coater.

DETAILED DESCRIPTION OF THE INVENTION

Encapsulated individual particles of rare earth permanent magnet material based on iron, neodymium and/or praseodymium, and boron are provided which are characterized by enhanced oxidation resistance. The encapsulated particles preferably have three distinct organic overlayers and are useful for the subsequent formation of a high coercivity permanent magnet article requiring good oxidation resistance.

The composition of the particles consist of, on an atomic percentage basis, about 40 to 90 percent of iron or mixtures of cobalt and iron, with the iron preferably making up at least 60 percent of the nonrare earth metal content; about 10 to 40 percent of rare earth metal that necessarily includes neodymium and/or praseodymium, with the neodymium and/or praseodymium preferably making up at least about 60 percent of the rare earth content; and at least 0.5 percent boron. Preferably, iron makes up at least about 40 atomic percent of the total composition, and the neodymium and/or praseodymium make up at least about six atomic percent of the total composition. Also, preferably, the boron content is in the range of about 0.5 to about 10 atomic percent of the total composition, but the total boron content may suitably be higher than this depending on the intended application for the magnetic composition.

Specific compositions which have been useful in preparing permanent magnet particles of this type, in corresponding weight percentages, are as follows and contain the magnetic phase consisting of $Fe_{14}Nd_2B$ (or the equivalent) tetragonal crystals; about 27 to 31.5 percent rare earth (wherein 95 percent of this constituent is neodymium and the remainder is essentially praseodymium); about 0.8 to about 1.0 percent boron; and the balance being iron with cobalt being substituted for the iron in some instances from about 2 to about 16 percent. In addition, gallium may also be added in an amount of between about 0.55 and 0.75 percent.

However, it is to be understood that the teachings of this invention are applicable to the larger family of compositions as described above in atomic percentages and will be referred to generally as an iron-neodymium-boron composition.

The iron-neodymium-boron magnetic particles based on such compositions may be prepared by rapidly solidifying a melt of the composition to produce fine grained, magnetically isotropic platelets of ribbonlike fragments. A commonly used technique would be melt spinning. This technique is well known in the art, although other suitable means may also be employed to form the particles. The average diameter of the particles ranges from about 100 to about 300 microns but may vary considerably. Each particle contains $Fe_{14}Nd_2B$ (or the equivalent) tetragonal crystals that provide magnetic properties to the material.

Generally, the magnetic properties for these melt-spun particles vary as follows, but depend on the actual constituents of the alloy, particularly the amounts of iron, cobalt and rare earth within the composition. Typically, these melt-spun isotropic particles have a residual induction ($B_r$) ranging from about 7.3 to about 8.3 kiloGauss, a coercive force ($H_c$) ranging from about 5.5 to about 6.5 kiloOersteds with an intrinsic coercive force ($H_{ci}$) ranging from about 8 to about 18 kiloOersteds, and a maximum energy product ($BH_{max}$) ranging from about 11 to about 12.5 MegaGaussOersteds.

These particles may be compaction molded at room temperature using an appropriate epoxy to form useful magnet articles. The magnetic properties of these molded articles generally vary as follows, but again depend on the actual composition of the alloy. Typically, their residual induction ($B_r$) ranges from about 6 to about 7 kiloGauss, coercive force ($H_c$) ranges from about 5 to about 6 kiloOersteds with an intrinsic coercive force ($H_{ci}$) ranging from about 9 to about 16 kiloOersteds, and maximum energy product ($BH_{max}$) ranges from about 8.5 to about 9.5 MegaGaussOersteds.

In addition, these particles may be hot worked and pressed at an appropriate elevated temperature to form anisotropic magnetic particles. The anisotropic magnetic properties generally range as follows, but again depend on the actual composition of the alloy. Typically, the anisotropic particles have a residual induction ($B_r$) ranging from about 11 to about 12 kiloGauss, a coercive force ($H_c$) ranging from about 10 to about 11.6 kiloOersteds with an intrinsic coercive force ($H_{ci}$) ranging from about 14 to about 18 kiloOersteds, and a maximum energy product ($BH_{max}$) of at least about 30 to about 35 MegaGaussOersteds.

In accordance with this invention, the iron-neodymium-boron particles are first individually encapsulated with a first organic layer. This first layer preferably contains three separate but synergistic constituents which retard the oxidation of the coated particle. We have determined that the combination of these three separate constituents helps to retard the corrosion mechanisms which occur within the iron-neodymium-boron particles, presumably by interfering with the charge transfer mechanism during the oxidation-reduction reaction inherent to the corrosion process. This interference improves the corrosion resistance and high temperature stability of the highly reactive iron-neodymium-boron particles.

The preferred composition of this first layer consists of equal amounts of a primary antixodidant constituents, a secondary antioxidant constituents and an oxidation inhibitor constituents. Specifically, the preferred primary antioxidant constituents is a high molecular weight hindered phenolic antioxidant, 2,2-Bis [4-(2-(3,5-di-tert-butyl-4 hydroxyhydrocinnamoyloxy)) ethoxyphenyl] propane, having the empirical formula $C_{53}H_{72}O_8$ and a molecular weight of approximately 836, and available commercially from ICI Specialty Chemicals as Topanol 205. The preferred secondary antioxidant constituents is a thioester, dilaurylthiodipropionate, having the empirical formula $C_{30}H_{58}O_4S$ and a molecular weight of approximately 514, and available commercially from Morton Thiokol Inc. as CARSTAB DLTDP. The preferred metal oxidation inhibitor constituent, Oxalyl bis[benzylidenehydrazide], has an empirical formula of $C_{16}H_{14}O_2N_4$ and a molecular weight of approximately 294 and is commercially available from Eastman Chemicals as EASTMAN Inhibitor OAHB. It is probable that the oxidation inhibitor operates by reacting with and deactivating the metals during the oxidation process.

These three preferred constituents of the first oxidation-resistant layer have been determined to work synergistically to produce the optimum oxidation resistance for the epoxy coated iron-neodymium-boron particles. It is foreseeable that instead of encapsulating the magnet particles with the synergistic combination of equal amounts of the three preferred constituents, the magnet particles could be encapsulated with any combination of the constituents, including only a single constituent, or various amounts of each constituent, as well as suitable substitutes for the constituents. Other suitable substitutes for the individual antioxidant constituents could include other hindered phenols like the bisphenols or the thiobisphenols, or other polymers such as phenols or amines, more specifically, monophenols, phenol ethers, aminophenols, diphenylamines, phenylenediamines and quinolines, as well as various other antioxidants. Suitable substitutes for the oxidation inhibitor could include various other known inhibitors. However the preferred composition containing equal amounts of the three constituents is favored because of its beneficial synergistic effect resulting in improved oxidation resistance.

Preferably, each constituent is present in equal amounts, about 0.2 weight percent each, so as to optimize the contributions of each constituent. Therefore, the total amount attributable to the first layer is about 0.6 weight percent as compared to the total mass of the particles. The amount of each constituent may vary from about 0.05 weight percent to about 1.5 weight percent, with the total amount for the first layer then varying from about 0.15 weight percent to about 4.5 weight percent. Obviously, a minimum amount of the constituents is required to result in the desired oxidation resistance, however, practically a maximum amount is also desired, so as to prevent detrimental effects to the density and overall magnetic properties of the resultant molded article produced from such encapsulated particles.

A second organic layer is next deposited onto the first oxidation-resistant organic layer so as to further encapsulate the iron-neodymium-boron particles. This second layer provides the adhesive binder for the subsequent compaction and molding of the particles. Preferably, this second organic layer consists of an appropriate thermosetting epoxy resin binder, such as a phenol-formaldehyde type thermoset epoxy resin, which is commercially available under a family of compositions known by the trade name Novolak. Other suitable epoxies could also foreseeably include other known thermoset resins or binders, and possibly even some thermoplastics; however, their use would depend on the actual constituents employed within the various encapsulating layers.

Preferably, this second epoxy layer is present in an amount of about 1.5 weight percent as compared to the total mass of the particles; however, this amount could foreseeably vary from about 0.1 weight percent to about 10 weight percent. If there is too little an amount of epoxy, then the adhesive forces are insufficient during subsequent molding of the particles, and if there is too great an amount of epoxy, then the overall density and physical characteristics of the molded magnet are diminished. Therefore, about 1.5 weight percent for the epoxy layer appears to be optimal. This ensures a sufficient amount of the epoxy for adhesion of the compacted particles during subsequent molding operations, without detrimentally affecting the compacted density or physical properties of the molded parts which may occur if too large an amount of adhesive is employed.

It is to be noted that the epoxy resin binder may be mixed with an appropriate accelerator to enable the facile curing of the epoxy during subsequent molding operations. The particular accelerator employed may vary depending on the particular application and processing parameters, such as the temperature of the subsequent curing step and the solvent used to deposit the epoxy resin. The choice of accelerator is within the common knowledge of a routineer in the art, and therefore will not be discussed more fully here. In addition, the actual deposition of the three layers onto the particles is discussed more fully later.

It should be noted that it is possible that this intermediate layer consisting of the epoxy resin binder may remain somewhat sticky or tacky after deposition depending on the accelerator employed. Considerations include whether the accelerator and epoxy resin are in liquid or solid form during deposition, and the activation temperature of the accelerator, as well as other considerations. If the coated particles remain tacky after deposition of the epoxy resin, it may be detrimental in that the subsequent processing of the particles may be hindered since the particles do not freely flow during compaction and molding.

Therefore, a third layer may be deposited onto the particles so as to alleviate the tackiness associated with the particles after deposition of the epoxy and thereby improve the handling and processing of such particles. Preferably, this third and outermost organic layer consists of a film former such as polystyrene; however, other known polymer film formers such as the polyesters, as well as others, could also be employed. The polystyrene layer is preferred since it provides a smooth, low coefficient of friction surface which keeps the particles free flowing for easy handling and processing. Yet the polystyrene shell fractures relatively easily during subsequently applied pressure during the molding of the particles so as to allow the underlying epoxy to adhere the particles into a desired shape. In addition, polystyrene is readily available and a practical choice.

This third polystyrene layer is present in an amount of about 0.5 weight percent as compared to the total weight of the particles; however, this amount could also vary from about 0.1 weight percent to about 10.0 weight percent if desired. As stated previously, too little an amount of polystyrene will not alleviate the tackiness associated with the epoxy-coated particles, and too great an amount will detrimentally affect the final molded article.

The three preferred organic layers are deposited sequentially onto the iron-neodymium-boron particles. Each layer is preferably deposited onto the individual particles from a spray containing the particular constituent(s) dissolved in an industrially acceptable solvent, using fluidized bed-coating techniques. So as to ensure that individual particles are coated, rather than clusters of particles as in the prior practices, the solution containing the particular constituents and solvent is sprayed into a fluidized bed of airborne particles circulating in a suitable coating apparatus. Suitable apparatus for conducting such fluidized bed coating are well known in the art.

Preferably, the particles are coated using a Wurster-type batch coating apparatus described in U.S. Pat. Nos. 2,648,609 and 3,253,944 to Wurster and shown in the accompanying FIGURE. The apparatus contains a cylindrical outer vessel 2 having a floor 4 with a plurality of perforations 6, through which heated air or inert gas is passed upwardly, to heat and fluidize a batch of the iron-neodymium-boron particles (not shown) initially charged into the vessel 2 and lying atop the floor 4. The size of the perforations 6 in the floor 4 decreases from the center of the floor 4 radially outwardly, such that the perforations 10 at the center of the floor 4 are larger than those perforations 20 nearer the periphery of the floor 4.

Within the outer vessel 2 is a concentric inner open-ended cylinder 8 suspended above the center of the perforated floor 4 so as to be above the larger diameter centermost perforations 10. A spray nozzle 12 is centered beneath the inner cylinder 8 for directing a spray 14 of the particular solution upwardly into the inner cylinder 8 as the fluidized particles circulate upwardly through the inner cylinder 8. Because the larger perforations 10 in the center of the floor 4 of vessel 2 lie immediately beneath inner cylinder 8, a higher volume of air moves upwardly through inner cylinder 8 than outside inner cylinder 8 which results in some of the particles being carried upwardly through inner cylinder 8 while others descend in the annular region 18 between the inner 8 and outer 2 cylinders where the air flow is less.

Thus, the particles continuously circulate upwardly through the center of inner cylinder 8 and downwardly on the outside 18 thereof (as represented by the arrows 16), and each particle makes repeated passes through the coating zone in inner cylinder 8. As the particles exit the top of inner cylinder 8 and enter the larger cylinder 2, they decelerate and move radially outwardly and fall back down through the annular zone 18. The large apertures 20 adjacent outer vessel 2 provide more air along the inside face of the outer wall of outer vessel 2, which keeps the particles from statically clinging to the outer wall as well as provides a transition cushion for the particles making the bend into inner cylinder 8.

The air that suspends the particles also serves to vaporize the solvent in the spray 14 and causes the desired solute constituent to deposit onto the particles. The particles rapidly circulate in this manner and, on each pass through inner cylinder 8, receive an additional deposit so that the particular layer of material is actually built up over a period of time with each pass of the particle through the coating zone. During the coating process, droplets of the sprayed solution coalesce onto each airborne particle. The solvent evaporates due to the movement of the particles through the chamber and/or the elevated temperature of deposition, such that only the particular solute remains on each particle. Statistically, each particle is exposed to the coating zone the same number of times, thereby ensuring that each particle will receive a continuous substantially uniform coating of the desired composition.

In the preferred embodiment, the solutions used to deposit the particular constituents of each encapsulating layer are as follows.

The first layer, which provides the oxidation resistant barrier consisting of equal amounts of the preferred hindered phenolic antioxidant, 2,2-Bis[4-(2-(3,5-di-tert-butyl-4 hydroxyhydrocinnamoyloxy)) ethoxyphenyl] propane; the preferred thioester, dilaurylthiodipropionate; and the preferred oxidation inhibitor, Oxalyl bis[-benzylidenehydrazide], is mixed with an appropriate solvent, such as conventional solutes such as toluene or acetone. The preferred solution contains about 90 weight percent solvent, with the remainder of the solution containing equal amounts of the three constituents. The amount of solvent may vary widely, such as from about 50 weight percent to about 99 weight percent. However, it is most desirable to employ a large amount of the solvent so as to ensure adequate droplet formation of the solution during the spray coating process.

If toluene is employed, then the particles are generally first heated by circulating the particles with warmed air within the fluidized bed chamber to a temperature of about 30° C. to 80° C. This is preferred since toluene is not highly volatile, particularly as compared to acetone, and is characterized by a relatively high vaporization temperature. If acetone is employed as the solvent, then the particles need only to be heated to about 35° C. before spraying of the solution. It is foreseeable that the deposition may occur at room temperature using either solvent; however, it may require a longer processing time.

The spray rate used during the deposition process for all three organic layers may vary from about 20 to about 50 grams of solution per minute for a seven-inch diameter coating chamber 2. (The rate of deposition will vary depending on the size of the coating chamber.) The solution is sprayed until the particles are sufficiently and uniformly coated with the organic layer. For the deposition of the first organic layer, deposition occurs until this first oxidation-resistant organic layer is approximately 0.6 weight percent as compared to the total weight of the iron-neodymium-boron particles. After deposition of this first oxidation-resistant barrier layer, the particles are allowed to cool while the second solution is introduced into the spray chamber.

The second encapsulating layer consisting of the preferred Novolak epoxy resin binder which may be blended with either a liquid or solid accelerator or alternatively the accelerator may be eliminated is then mixed with a solvent, such as acetone. The solution is again approximately 90 weight percent acetone with the remainder being the epoxy resin and accelerator; however, the amount of the solvent may vary greatly as discussed above with respect to the deposition of the first organic layer. Acetone is preferred since it can be sprayed at a relatively low temperature, i.e., about 35° C., due to its high volatility. The low temperature deposition of the epoxy binder is preferred since it avoids unnecessary curing of the epoxy binder and helps to keep the epoxy from becoming unduly tacky during processing. Again, it is foreseeable that the deposition may occur at room temperature; however, this would require a longer processing time. This second encapsulating layer is deposited to a sufficiently uniform thickness corresponding to preferably approximately 1.5 weight percent epoxy as compared to the total mass of the particles.

The third encapsulating layer, which is optional but preferred, consists of polystyrene which provides a solid smooth shell around the underlying layers and base magnet particle so as to improve the handling and processing of the particles. The polystyrene is preferably mixed with an appropriate solvent, such as acetone, toluene or methylene chloride. The solution is again approximately 90 weight percent solvent, which may vary greatly, with the remainder being the polystyrene. Acetone is preferred since it can also be sprayed at a relatively low temperature, i.e., about 35° C., due to its relatively high volatility. (Again, the deposition may occur at room temperature; however, this would lengthen the processing time.) The low temperature deposition of the polystyrene shell is preferred since it avoids unnecessary curing of the underlying epoxy binder layer, thereby preventing the epoxy from becoming unnecessarily sticky during processing. This outermost polystyrene layer is deposited to a sufficiently uniform thickness corresponding to preferably approximately 0.5 weight percent as compared to the total mass of the particles.

After encapsulation of the iron-neodymium-boron particles with the three preferred layers, the coated particles are then molded using known methods and cured at a temperature appropriate for the epoxy and accelerator system used. Such a temperature is within the knowledge of the art and varies depending on the particular accelerator employed with the thermosetting epoxy binder.

The oxidation resistance of the preferred encapsulated iron-neodymium-boron particles, characterized by a first layer of an antioxidant barrier in the amount of about 0.6 weight percent as compared to the total mass of the particles, a second layer of the thermosetting epoxy in an amount of about 1.5 weight percent, and an outermost layer of polystyrene in an amount of about 0.5 weight percent, was determined using conventional techniques.

In particular, after exposure to 2000 hours in a salt dip with 81 percent humidity, the preferred encapsulated particles exhibited a weight gain of less than about 0.5 percent, whereas the non-encapsulated iron-neodymium-boron particles exhibited a weight gain of about 3.5 percent.

In addition, after exposure to 2000 hours in a water dip containing 81 percent humidity, the preferred encapsulated particles exhibited a weight gain of less than about 0.2 percent, whereas the non-encapsulated iron-neodymium-boron particles exhibited a weight gain of about 1.5 percent. Actually the preferred encapsulated particles leveled off at a weight gain of about 0.2 percent after 1000 hours, therefore showing no further weight gain after this initial exposure. It is believed that the initial weight gain is due to the absorption of water in the high humidity by the encapsulated particles, rather than oxidation of the particles. This may suggest that the oxidation-resistant barrier layer is still intact after exposure to such humidity, therefore being capable of suppressing further oxidation.

The preferred encapsulated particles were also subjected to heat aging experiments at both 125° C. and 155° C. After 5000 hours at 125° C., the preferred encapsulated particles exhibited about a 4.1 percent structural loss, while the non-encapsulated iron-neodymium-boron particles exhibited about an 8.5 percent structural loss. For the same test at 155° C., the preferred encapsulated particles exhibited a 7.9 percent structural loss, while the non-encapsulated iron-neodymium-boron particles exhibited a 14.5 percent structural loss.

The results of these tests show that the iron-neodymium-boron particles, which are individually encapsulated in accordance with this invention, exhibit enhanced oxidation resistance even at elevated temperatures. This is a particularly advantageous feature of these particles, making them particularly useful in the manufacture of molded permanent high coercivity magnets.

Therefore, while our invention has been described in terms of a preferred embodiment, it is apparent that other forms could be adopted by one skilled in the art, such as by modifying the particular constituents of each encapsulating layer or the processing parameters employed, or by substituting appropriate magnetic materials, or by utilizing a different deposition technique which still ensures the individual encapsulation of each particle. Accordingly, the scope of our invention is to be limited only by the following claims.

The embodiments of the invention in which an exclusive property or privilege is claimed are defined as follows:

1. Permanent magnet particles, ranging in size from about 100 to about 300 microns, useful for molding into permanent magnet articles, each of said particles comprising an iron-neodymium-boron core that has as its magnetic constituent the tetragonal crystal phase $Fe_{14}Nd_2B$ and a composition on a weight percent basis of about 27 to 31.5 percent rare earth wherein at least about 95 percent of this constituent is neodymium and the remainder is essentially praseodymium, about 0.8 to about 1.0 percent boron, up to about 16 percent cobalt, and the balance being iron, said core having a magnetic coercivity at room temperature of at least about 5,000 Oersteds;

a first continuous layer comprising a hindered phenolic antioxidant, a thioester and an oxidation inhibitor for retarding oxidation of said core, said first continuous layer being substantially uniform and essentially encapsulating said core, said first continuous layer being present in an amount of from about 0.15 weight percent to about 4.5 weight percent as compared to the total mass of said particles; and a second continuous layer of an epoxy resin, said second continuous layer being substantially uniform and overlaying said first continuous layer so as to further encapsulate said core and said first continuous layer, said second continuous layer being present in an amount of from about 0.1 weight percent to about 10.0 weight percent as compared to the total mass of said particles;

such that said first continuous layer substantially retards oxidation of said core, while said second continuous layer provides the adhesion required for subsequent molding of said encapsulated permanent magnet particles into a permanent magnet article.

2. Permanent magnet particles as recited in claim 1 wherein each of said particles further comprises a third continuous layer of a film-forming polymer, said third continuous layer being substantially uniform and overlaying said second continuous layer so as to further encapsulate said core and said first and second continuous layers, thereby providing a free flowing particle, said third continuous layer being present in an amount of from about 0.1 weight percent to about 10.0 weight percent as compared to the total mass of said particles.

3. Permanent magnet particles as recited in claim 1 wherein said first continuous layer comprises substantially equal amounts of said hindered phenolic antioxidant, said thioester and said oxidation inhibitor.

4. Permanent magnet particles as recited in claim 3 wherein said hindered phenolic antioxidant is 2,2-Bis[4-(2-(3,5-di-tert-butyl-4 hydroxyhydrocinnamoyloxy)) ethoxyphenyl] propane, said thioester is dilaurylthiodipropionate and said oxidation inhibitor is oxalyl bis[benzylidenehydrazide].

5. Permanent magnet particles as recited in claim 1 wherein said second continuous layer comprises a phenol-formaldehyde thermoset epoxy resin.

6. Permanent magnet particles as recited in claim 2 wherein said film-forming polymer is selected from the group consisting of polystyrene and polyesters.

7. Permanent magnet particles ranging in size from about 100 to about 300 microns useful for molding into permanent magnet articles, each of said particles comprising an iron-neodymium-boron core that has as its magnetic constituent the tetragonal crystal phase $Fe_{14}Nd_2B$ and a composition on a weight percent basis of about 27 to 31.5 percent rare earth wherein at least about 95 percent of this constituent is neodymium and the remainder is essentially praseodymium, about 0.8 to about 1.0 percent boron, up to about 16 percent cobalt, and the balance being iron, said core having a magnetic coercivity at room temperature of at least about 5,000 Oersteds;

a first continuous layer comprising substantially equal amounts of a hindered phenolic antioxidant, a thioester and an oxidation inhibitor for retarding oxidation of said core, said first continuous layer being substantially uniform and completely encapsulating said core, said first continuous layer being present in an amount of from about 0.15 weight percent to about 4.5 weight percent as compared to the total mass of said particles;

a second continuous layer of a phenol-formaldehyde thermoset epoxy resin, said second continuous layer being substantially uniform and completely overlaying said first continuous layer so as to further encapsulate said core, said second continuous layer being present in an amount of from about 0.1 weight percent to about 10.0 weight percent as compared to the total mass of said particles;

a third continuous layer of a film-forming polymer selected from the group consisting of polystyrene and polyesters, said third continuous layer being substantially uniform and completely overlaying said second continuous layer so as to further encapsulate said core, thereby providing a free flowing particle useful for molding into magnetic articles, said third continuous layer being present in an amount of from about 0.1 weight percent to about 10.0 weight percent as compared to the total mass of said particles;

such that said continuous layers sufficiently cooperate so that said first continuous layer substantially retards oxidation of said core, said second continuous layer provides the adhesion required for subsequent molding of said encapsulated permanent magnet particles into a permanent magnet article, and said third continuous layer provides a shell covering said particle for improved processing of said particle.

8. Permanent magnet particles as recited in claim 7 wherein said hindered phenolic antioxidant is 2,2-Bis[4-(2-(3,5-di-tert-butyl-4 hydroxyhydrocinnamoyloxy)) ethoxyphenyl] propane, said thioester is dilaurylthiodipropionate and said oxidation inhibitor is oxalyl bis[benzylidenehydrazide].

* * * * *

UNITED STATES PATENT AND TRADEMARK OFFICE
CERTIFICATE OF CORRECTION

PATENT NO. : 5,272,008

DATED : December 21, 1993

INVENTOR(S) : Jon C. Shain et al

It is certified that error appears in the above-identified patent and that said Letters Patent is hereby corrected as shown below:

On the title page: Item [54] and Column 1, line 3,

Title page, in the title after "MAGNET" insert -- PARTICLES --.

Signed and Sealed this

Twenty-ninth Day of November, 1994

Attest:

BRUCE LEHMAN

*Attesting Officer*

*Commissioner of Patents and Trademarks*